A. G. Davis.
Broom or Brush Holder.

№ 73169. Patented Jan. 7, 1868.

Witnesses.
Alex F. Roberts
J. Alison Fraser

Inventor:
Anthony G. Davis
per Munn &Co
Attorneys

United States Patent Office.

ANTHONY G. DAVIS, OF WATERTOWN, CONNECTICUT, ASSIGNOR TO HIMSELF AND AUGUSTUS N. WOOLSON, OF SAME PLACE.

Letters Patent No. 73,169, dated January 7, 1868.

IMPROVED BROOM OR BRUSH-HOLDER.

The Schedule referred to in these Letters Patent and making part of the same.

TO ALL WHOM IT MAY CONCERN:

Be it known that I, ANTHONY G. DAVIS, of Watertown, in the county of Litchfield, and State of Connecticut, have invented a new and useful Improvement in Broom or Brush-Holder; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish a neat, cheap, simple, convenient, and effective device for holding a broom or brush suspended when not in use; and it consists in the spring-holder, made in one or two pieces, and so formed as to receive and hold the handle of the broom or brush between its projecting elastic ends, and in the combination therewith of a stop or brace-bar; the whole being constructed and arranged as hereinafter more fully described.

Figure 1:
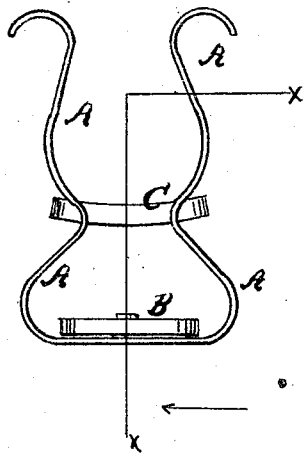
Figure 1 is a side view of my improved holder.
Figure 2:
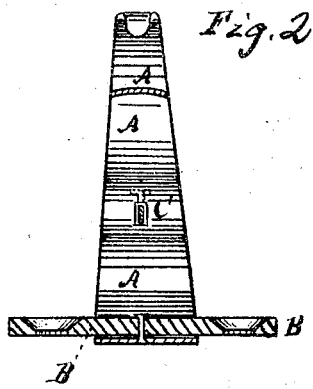
Figure 2 is a detail view of the same, partly in section, through the line $x\,x$, fig. 1.

A is the spring-holder, the middle part of which is secured to a small plate, B, the shape of which is immaterial, for convenience in securing it to the wall or other support to which it is to be attached. If desired, the holder A may be made in two pieces, the inner ends of which are riveted or otherwise firmly secured to each other and to the plate B. The outer or projecting ends of the holder A are curved into substantially the form shown in fig. 1, so as to fit around and clasp the handle of the brush or broom to be held. The extreme outer ends of the holder A are curved outward, for convenience in inserting the broom or brush-handle. C is a brace-bar or stop, which passes through slots in or near the middle of the projecting arms or parts of the holder A. The ends of the bar C are bent over, so that it cannot be drawn or lost out, and it is so arranged that its edge may be presented to the broom or brush-handle, and thus prevent it from being forced in too far, and, also, to assist in holding the said handle. If desired, the bar may be replaced by a bar or arm attached to the plate B, between the parts of the holder A, so as to project between said parts sufficiently far to act as a stop, in the same manner as the bar C. But I prefer the construction first described, for, when thus constructed, the bar C acts as a brace or support to the projecting parts of the holder A, and prevents them from being forced too far apart.

I claim as new, and desire to secure by Letters Patent—

The broom-brush holder, constructed as described, consisting of the curved spring-arms A, made in one piece, and secured in position under the bar B, and slotted to receive the sliding bar C, as herein described, for the purpose specified.

ANTHONY G. DAVIS.

Witnesses:
  H. N. FIELDS,
  GEO. L. FIELDS.